(12) United States Patent
Guarino et al.

(10) Patent No.: US 10,288,160 B2
(45) Date of Patent: May 14, 2019

(54) DRIVE UNIT WITH LIMITED SLIP AND DRIVELINE DISCONNECT CAPABILITY

(71) Applicant: Ford Global Technologies, LLC, Dearborn, MI (US)

(72) Inventors: William David Guarino, Dearborn, MI (US); Paul Moubarak, Redford Twp., MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 15/292,569

(22) Filed: Oct. 13, 2016

(65) Prior Publication Data

US 2018/0106353 A1     Apr. 19, 2018

(51) Int. Cl.
| | |
|---|---|
| *F16H 48/22* | (2006.01) |
| *B60K 17/16* | (2006.01) |
| *B60K 23/04* | (2006.01) |
| *F16H 48/08* | (2006.01) |

(52) U.S. Cl.
CPC ............. *F16H 48/22* (2013.01); *B60K 17/20* (2013.01); *B60K 23/04* (2013.01); *B60K 2023/043* (2013.01); *B60Y 2400/424* (2013.01); *B60Y 2400/804* (2013.01); *F16H 48/08* (2013.01)

(58) Field of Classification Search
CPC ............................... F16D 21/06; F16D 13/385
USPC .............................................. 192/48.1, 48.91
See application file for complete search history.

(56) References Cited

U.S. PATENT DOCUMENTS

| | | | |
|---|---|---|---|
| 6,379,277 B1 | 4/2002 | Victoria et al. | |
| 6,520,885 B2 | 2/2003 | Gassmann et al. | |
| 6,827,663 B2 * | 12/2004 | Tucker-Peake | B60K 17/356 192/84.6 |
| 8,235,183 B2 | 8/2012 | Dennis et al. | |
| 8,469,854 B1 | 6/2013 | Downs et al. | |
| 8,523,737 B1 | 9/2013 | Krysztof et al. | |
| 8,678,971 B2 * | 3/2014 | Schmidt | F16D 28/00 475/231 |
| 8,771,129 B2 * | 7/2014 | Bradford, Jr. | F16H 48/22 475/234 |
| 9,199,640 B2 | 12/2015 | Weston et al. | |
| 2017/0175823 A1 * | 6/2017 | Cooper | F16D 23/12 |
| 2018/0106301 A1 * | 4/2018 | Moubarak | F16D 23/12 |

FOREIGN PATENT DOCUMENTS

| | | |
|---|---|---|
| GB | 1209793 | 10/1970 |
| WO | 2016007724 A2 | 1/2016 |

* cited by examiner

*Primary Examiner* — Derek D Knight
(74) *Attorney, Agent, or Firm* — David Kelley; Brooks Kushman, P.C.

(57) ABSTRACT

A clutch assembly includes a first clutch assembly having first clutch plates rotatably fixed to a first shaft and first carrier plates rotatably fixed to a clutch basket. The clutch assembly further includes a second clutch assembly having second clutch plates rotatably fixed to a second shaft and second carrier plates rotatably fixed to the clutch basket. The first and second clutch assemblies rotate about a common central axis and are actuated by a common actuator.

18 Claims, 13 Drawing Sheets

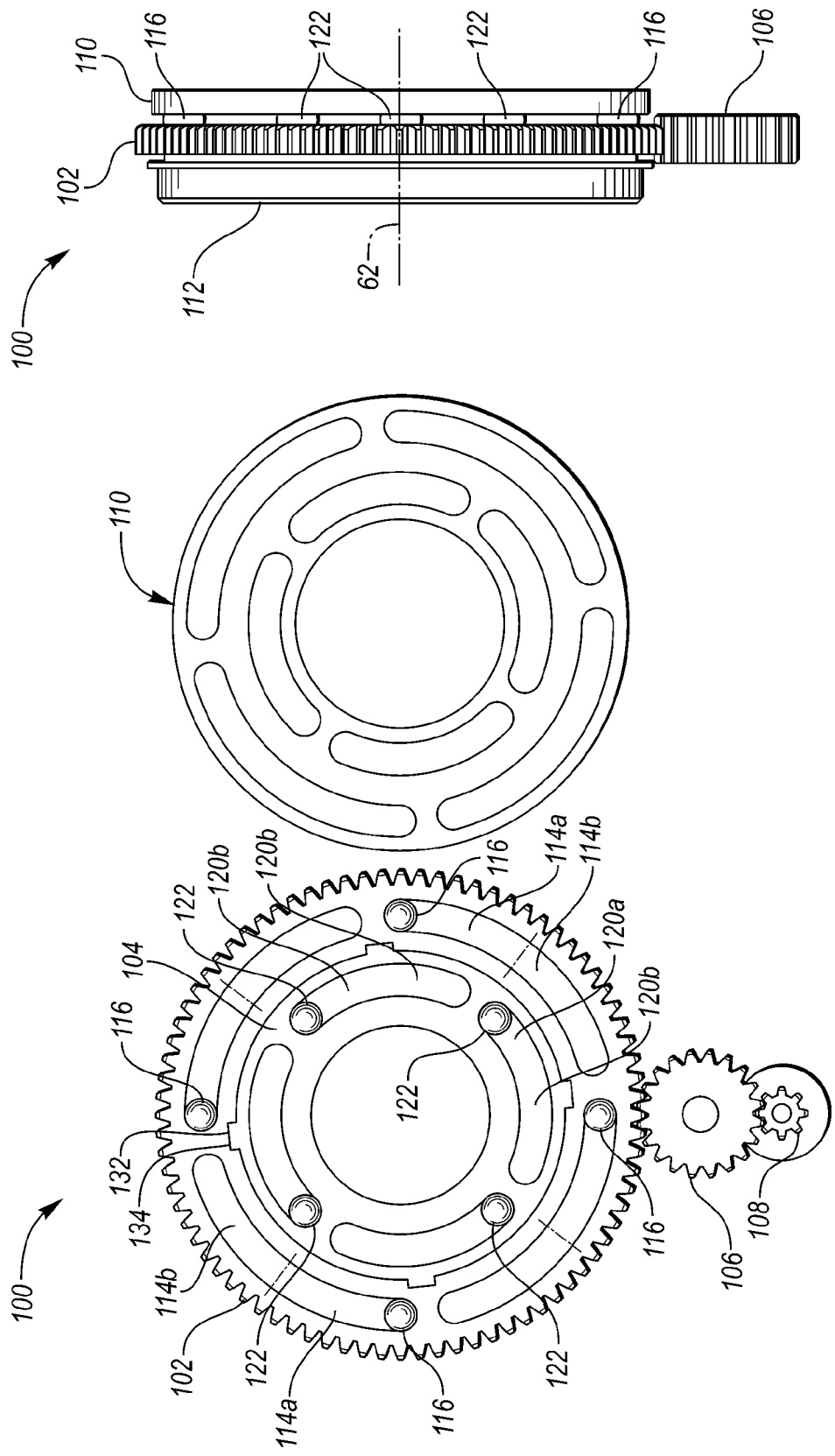

US 10,288,160 B2

DRIVE UNIT WITH LIMITED SLIP AND DRIVELINE DISCONNECT CAPABILITY

TECHNICAL FIELD

This disclosure relates to a clutch assembly and more particularly to a secondary axle clutch assembly having torque transfer capabilities and limited slip differential capabilities actuated by a single actuator.

BACKGROUND

A motor vehicle may be provided with an all-wheel-drive (AWD) powertrain capable of transmitting power to the wheels of a primary axle and to the wheels of a secondary axle. Power is provided to the secondary axle through a rear drive unit having a differential assembly. Various differential assemblies may be utilized, including open, limited slip, and locking differentials. Open differentials have a gear train that allows the output shafts of the differential to spin at different speeds while maintaining the sum of their speeds proportional to the input of the differential, but the amount of torque transferred to the inner and outer wheels must be equal. A limited slip differential allows different amounts of torque to be transferred to the inner-wheel compared to the outer-wheel during a turn.

AWD systems tend to degrade vehicle fuel economy due to increased driveline parasitic losses even when AWD is not activated. These parasitic losses occur, in part, because the secondary drive wheels and their rotation cause a drag torque to be exerted on the driving element. An AWD vehicle may be provided with a driveline disconnect system that improves fuel economy by disconnecting parts of the driveline when AWD is not activated. In many aspects, this is accomplished with a side mounted clutch on a rear drive unit that functions as a torque transfer/disconnect device. In many instances, inclusion of a driveline disconnect system in a side clutch rear drive unit precludes the use of a mechanical limited slip differential in the rear drive unit.

SUMMARY

This disclosure relates to a clutch assembly having torque transfer capabilities and limited slip differential capabilities actuated by a single actuator. In some approaches, a secondary axle clutch assembly includes a differential carrier having a differential shaft rotatable about a central axis of rotation. A plurality of limited slip differential (LSD) clutch plates are rotatably fixed to the differential shaft and are axially movable relative to the differential shaft. An intermediate shaft extends coaxially with the differential shaft and is rotatable about the central axis of rotation. A plurality of torque clutch plates are rotatably fixed to the intermediate shaft and are axially movable relative to the intermediate shaft. A clutch basket extends over the torque clutch plates and the LSD clutch plates and is rotatable about the central axis of rotation. The clutch basket includes a first plurality of carrier plates disposed adjacent to the torque clutch plates and a second plurality of carrier plates disposed adjacent to the LSD clutch plates. An actuator is adapted to apply an axial force to the torque clutch plates and the LSD clutch plates to engage the torque clutch plates with the first plurality of carrier plates, and to engage the LSD clutch plates with the second plurality of carrier plates.

In some approaches, a clutch assembly includes a first clutch assembly having first clutch plates rotatably fixed to a first shaft and first carrier plates rotatably fixed to a clutch basket. The clutch assembly further includes a second clutch assembly having second clutch plates rotatably fixed to a second shaft and second carrier plates rotatably fixed to the clutch basket. The first and second clutch assemblies rotate about a common central axis and are actuated by a common actuator.

In still other approaches, a method of actuating multiple clutch assemblies includes axially displacing, using a common actuator, a first plurality of clutch plates rotationally fixed to a first shaft. The method further includes axially displacing, using the common actuator, a second plurality of clutch plates rotationally fixed to a second shaft. The first shaft is coaxial with the second shaft and extends at least partially within the second shaft.

BRIEF DESCRIPTION OF THE DRAWINGS

FIG. 11 is a front elevational view of a double ball ramp actuator.

FIG. 12 is a side elevational view of a double ball ramp actuator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
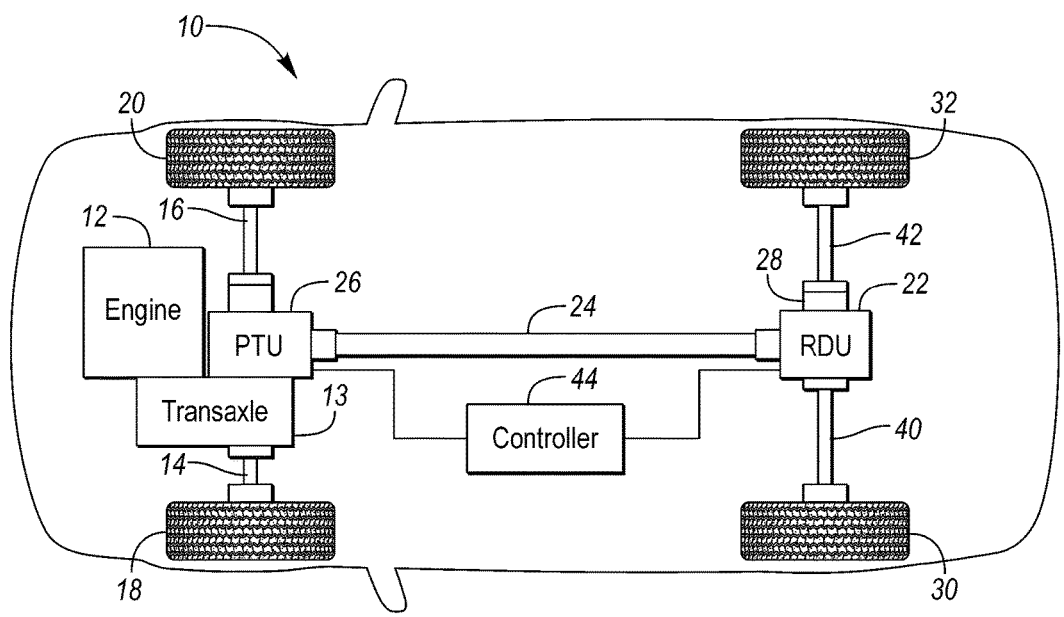
FIG. 1 is a schematic diagram showing a vehicle powertrain.
Figure 2:
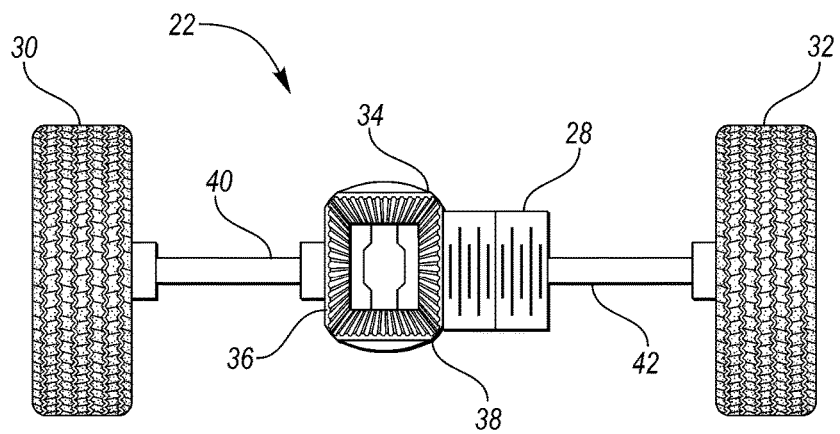
FIG. 2 is a schematic diagram showing a rear drive unit.

Referring to FIGS. 1 and 2, the powertrain of a motor vehicle 10 includes an engine 12, such as an internal combustion engine; a transaxle 13 for producing multiple forward drive speed ratios and reverse drive; halfshafts 14, 16 for transmitting rotating power between the transaxle's output and the front driven wheels 18, 20; a rear drive unit (RDU) 22; a driveshaft 24; a power transfer unit (PTU) 26 for transmitting rotating power between the transaxle's output and the driveshaft; and a clutch assembly 28 for providing limited slip capabilities and for connecting and disconnecting the output of the RDU and the rear driven wheels 30, 32.

As shown in FIG. 2, the RDU 22 includes a differential carrier 34. Inside the differential carrier 34 are a differential side gear 36, which is connected by a shaft 40 to wheel 30, and a differential side gear 38, which is connected by a shaft 42 to wheel 32. The differential assembly of the RDU 22 is, for example, a limited slip differential (LSD), and preferably an electronic limited slip differential (eLSD). Where an eLSD is utilized, the eLSD is controlled by at least one controller 44 (shown in FIG. 1), computer, or other such network of interconnected controllers in a control system. The eLSD controls the amount of clamping force applied in a clutch pack, as described in greater detail elsewhere herein. This provides a computerized control of the clutch pressure in order to selectively deliver various amounts of torque to the wheels 30, 32.

Although described herein in conjunction with a rear drive unit, it is expressly contemplated that the clutch assembly and/or the clutch actuator may be incorporated in a front drive unit, along the driveshaft, or in any other suitable region of a vehicle.

Figure 3:
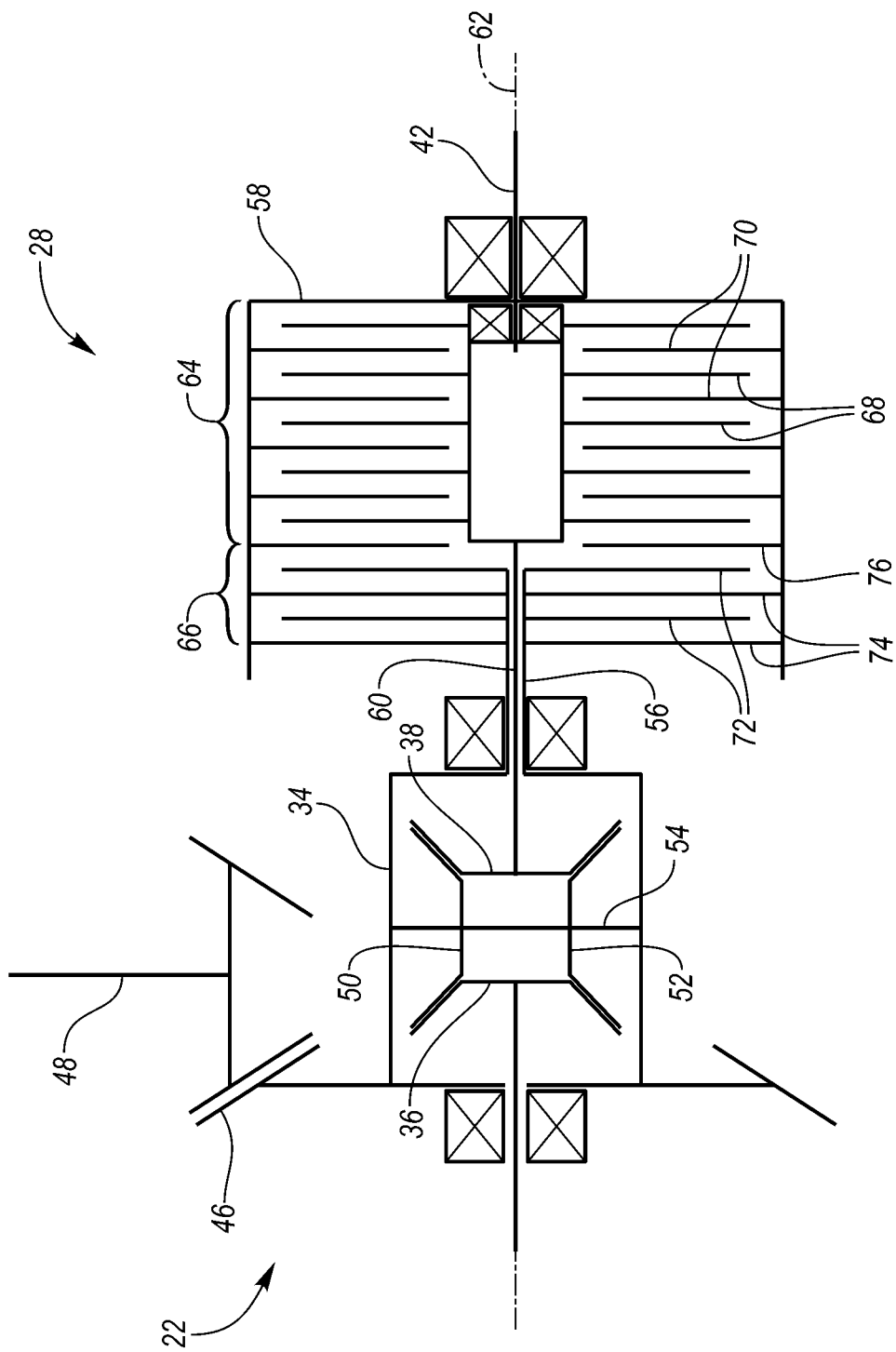
FIG. 3 is a schematic diagram showing a rear drive unit in a first stage.

Referring to FIG. 3, a ring gear 46 secured to the differential carrier 34 receives a torque input from an input pinion 48. The input pinion 48 is connected to a companion flange (not shown), which in turn is connected to a driveshaft (e.g., driveshaft 24 in FIG. 1) that transmits output torque from a power transfer unit (e.g., PTU 26 in FIG. 1), transmission, or transfer case to the RDU 22. Differential pinion gears 50, 52 are driveably connected to the differential carrier 34 by a pin 54 and are in continuous meshing engagement with the differential side gears 36, 38.

The differential carrier 34 includes a differential shaft 56 that extends into a clutch basket 58. An intermediate shaft 60 extends from the differential side gear 38 into the clutch basket 58. The intermediate shaft 60 extends coaxially with the differential shaft 56, and both are rotatable about the central axis of rotation 62. In a preferred approach, shown in FIG. 3, the intermediate shaft 60 has an outer diameter less than an inner diameter of the differential shaft 56, and at least a portion of the intermediate shaft 60 is disposed within and extends through at least a portion of the differential shaft 56. Other suitable configurations of the intermediate shaft 60 relative to the differential shaft 56 are possible.

The clutch assembly 28 includes a clutch basket 58 that houses a torque transfer clutch assembly 64 and an LSD clutch assembly 66. The torque transfer clutch assembly 64 and the LSD clutch assembly 66 are coaxial and rotate about a common central axis 62. In some approaches, the torque transfer clutch assembly 64 and the LSD clutch assembly 66 are immediately adjacent. In other approaches, the torque transfer clutch assembly 64 and the LSD clutch assembly 66 are adjacent and separated by a separator plate 76. Other coaxial arrangements are expressly contemplated.

The torque transfer clutch assembly 64 includes torque transfer clutch plates 68 that are coupled to a differential side gear (e.g., differential side gear 38) through the intermediate shaft 60. The torque transfer clutch plates 68 are preferably friction plates, but may also be steel plates (e.g., pressure plates) or combinations thereof, and may be formed of any suitable material. The torque transfer clutch plates 68 are rotatably fixed to the intermediate shaft 60 such that rotation of the intermediate shaft 60 causes corresponding rotation of the torque transfer clutch plates 68. The torque transfer clutch plates 68 are also axially movable relative to the intermediate shaft 60. In a preferred approach, the torque transfer clutch plates 68 are internally splined to the intermediate shaft 60. For example, a series of protrusions and recesses disposed at an interior diameter of the torque transfer clutch plates 68 may mesh with a corresponding series of protrusions and recesses disposed at an exterior diameter of the intermediate shaft 60. In this way, the torque transfer clutch plates 68 and the intermediate shaft 60 may be in continuous meshed engagement.

The torque transfer clutch assembly 64 also includes torque transfer carrier plates 70 that are coupled to the clutch basket 58. The torque transfer carrier plates 70 are preferably steel plates (e.g., pressure plates), but may also be friction plates or combinations thereof, and may be formed of any suitable material. The torque transfer carrier plates 70 are rotatably fixed to the clutch basket 58 such that rotation of the torque transfer carrier plates 70 causes corresponding rotation of the clutch basket 58. The torque transfer carrier plates 70 are also axially movable relative to the clutch basket 58. In a preferred approach, the torque transfer carrier plates 70 are externally splined to the clutch basket 58. For example, a series of protrusions and recess disposed at an exterior diameter of the torque transfer carrier plates 70 may mesh with a corresponding series of protrusions and recess disposed at an interior surface of the clutch basket 58. In another example, the torque transfer carrier plates 70 include one or more protrusions, and the clutch basket 58 includes one or more recesses or apertures adapted to receive the one or more protrusions.

Thus, when the torque transfer clutch plates 68 engage the torque transfer carrier plates 70, torque is transferred from the intermediate shaft 60 to the clutch basket 58 through the engaged torque transfer clutch plates 68 and torque transfer carrier plates 70. As the clutch basket 58 is rotatably coupled to the output shaft 42, torque is also directly transferred to the rear wheel 32. When the torque transfer clutch plates 68 disengage from the torque transfer carrier plates 70, the differential carrier 34 is disconnected and the rear wheel 32 is therefore disconnected from the powertrain of the vehicle 10. As such, the torque transfer clutch assembly 64 is capable of providing "disconnect" capabilities.

The LSD clutch assembly 66 includes LSD clutch plates 72 that are coupled to the differential carrier 34 through the differential shaft 56. The LSD clutch plates 72 are preferably friction plates, but may also be steel plates (e.g., pressure plates) or combinations thereof, and may be formed of any suitable material. The LSD clutch plates 72 are rotatably fixed to the differential shaft 56 such that rotation of the differential shaft 56 causes corresponding rotation of the LSD clutch plates 72. The LSD clutch plates 72 are also axially movable relative to the differential shaft 56. In a preferred approach, the LSD clutch plates 72 are internally splined to the differential shaft 56. For example, a series of protrusions and recesses disposed at an interior diameter of the LSD clutch plates 72 may mesh with a corresponding series of protrusions and recesses disposed at an exterior diameter of the differential shaft 56. In this way, the LSD clutch plates 72 and the differential shaft 56 may be in continuous meshed engagement.

The LSD clutch assembly 66 also includes LSD carrier plates 74 that are coupled to the clutch basket 58. The LSD carrier plates 74 are preferably steel plates (e.g., pressure plates), but may also be friction plates or combinations thereof, and may be formed of any suitable material. The LSD carrier plates 74 are rotatably fixed to the clutch basket 58 such that rotation of the LSD carrier plates 74 causes corresponding rotation of the clutch basket 58. The LSD carrier plates 74 are also axially movable relative to the clutch basket 58. In a preferred approach, the LSD carrier plates 74 are externally splined to the clutch basket 58. For example, a series of protrusions and recesses disposed at an exterior diameter of the LSD carrier plates 74 may mesh with a corresponding series of protrusions and recesses disposed at an interior of the clutch basket 58. In another example, the LSD carrier plates 74 include one or more protrusions, and the clutch basket 58 includes one or more recesses or apertures adapted to receive the one or more protrusions.

Thus, when the LSD clutch plates 72 engage the LSD carrier plates 74, torque is transferred from the differential shaft 56 to the clutch basket 58 through the engaged LSD clutch plates 72 and LSD carrier plates 74. As the clutch basket 58 is rotatably coupled to the output shaft 42, the torque is also directly transferred to the rear wheel 32. As such, the LSD clutch assembly 66 is capable of providing "limited slip" capabilities. As will be appreciated, the torque provided by the LSD clutch assembly 66 may be in addition to, or in place of, the torque applied by the torque transfer clutch assembly 64.

The torque transfer clutch assembly 64 and the LSD clutch assembly 66 may be separately activated by one or more actuators. FIG. 3 shows a clutch assembly 28 in which neither the torque transfer clutch assembly 64 nor the LSD clutch assembly 66 are activated. In this state, the RDU 22 does not apply torque to the rear wheels 30, 32 of the vehicle 10.

Figure 4:
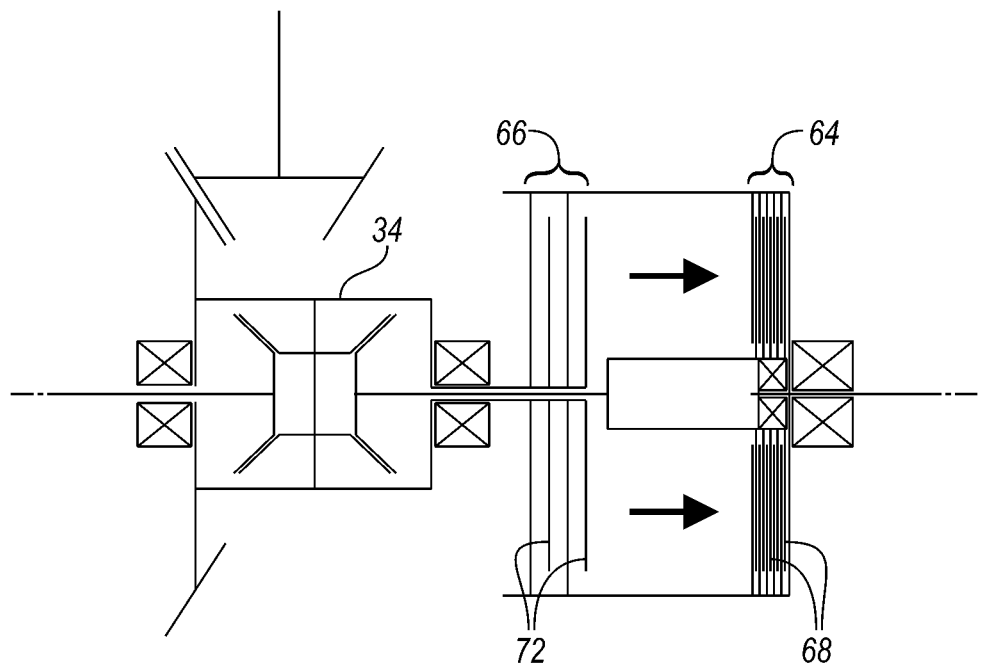
FIG. 4 is a schematic diagram showing the rear drive unit of FIG. 3 in a second stage.

FIG. 4 shows a clutch assembly 28 in which the torque transfer clutch assembly 64 has been activated (e.g., by the controller 44 moving a motor to a first motor position), but the LSD clutch assembly 66 has not been activated. In this state, the torque transfer clutch plates 68 and the torque transfer carrier plates 70 are axially moved into engagement, and the RDU 22 applies torque to the rear wheels of the vehicle. However, because the LSD clutch assembly 66 has not been activated, the LSD clutch plates 72 and the LSD carrier plates 74 are not engaged, and the differential assembly does not provide limited slip capabilities. Rather, the differential components of the RDU 22 continue to perform similar to that of an open differential. This may be the case, for example, when the controller 44 determines the vehicle 10 is accelerating or otherwise requires torque to be applied to the rear wheels 30, 32, but that differential control is unnecessary.

Figure 5:
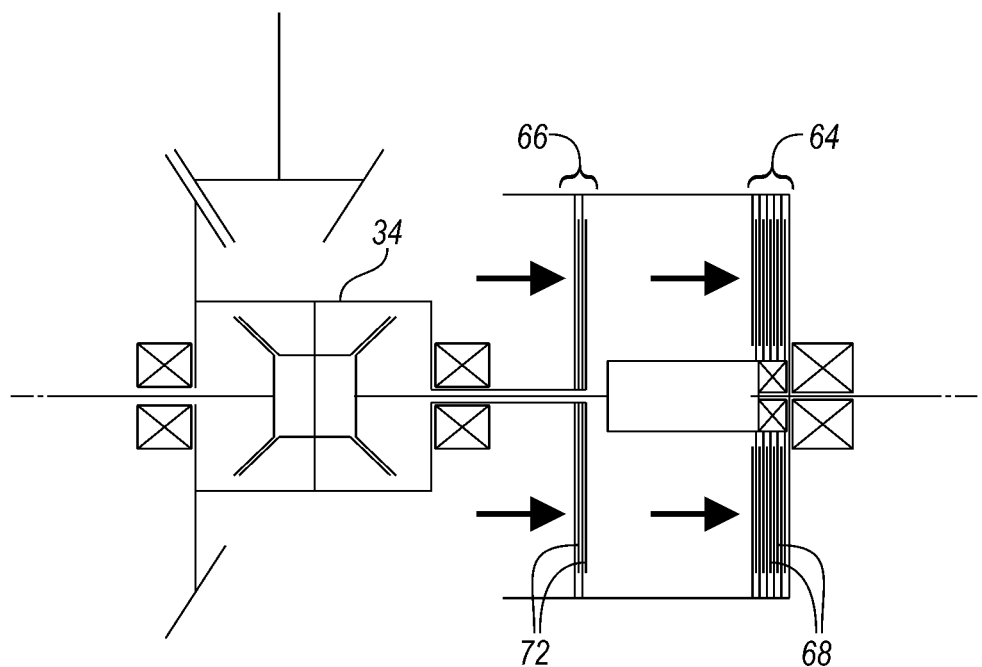
FIG. 5 is a schematic diagram showing the rear drive unit of FIG. 3 in a third stage.

FIG. 5 shows a clutch assembly 28 in which both the torque transfer clutch assembly 64 and the LSD clutch assembly 66 are activated (e.g., by the controller 44 moving a motor to a second motor position). In this state, the LSD clutch plates 72 and the LSD carrier plates 74 are axially moved into engagement, and the RDU 22 applies additional torque to the rear wheels of the vehicle. In this way, the differential components of the RDU 22 perform similarly to that of a locked differential. This may be the case, for example, when the controller 44 determines the vehicle 10 is accelerating or otherwise requires torque to be applied to the rear wheels 30, 32, and that differential control is required, for example, upon detecting decreased traction in one of the wheels.

In some aspects, the LSD clutch assembly 66 may be activated prior to activation of the torque transfer clutch assembly 64. Preliminary activation of the LSD clutch assembly 66 may result in a torque transfer; however, the torque applied may be at a very high resolution. Such high resolution may be preferable, for example, when the controller 44 attempts to modulate the speed of the driveshaft 24 during an engagement event.

Figure 6:
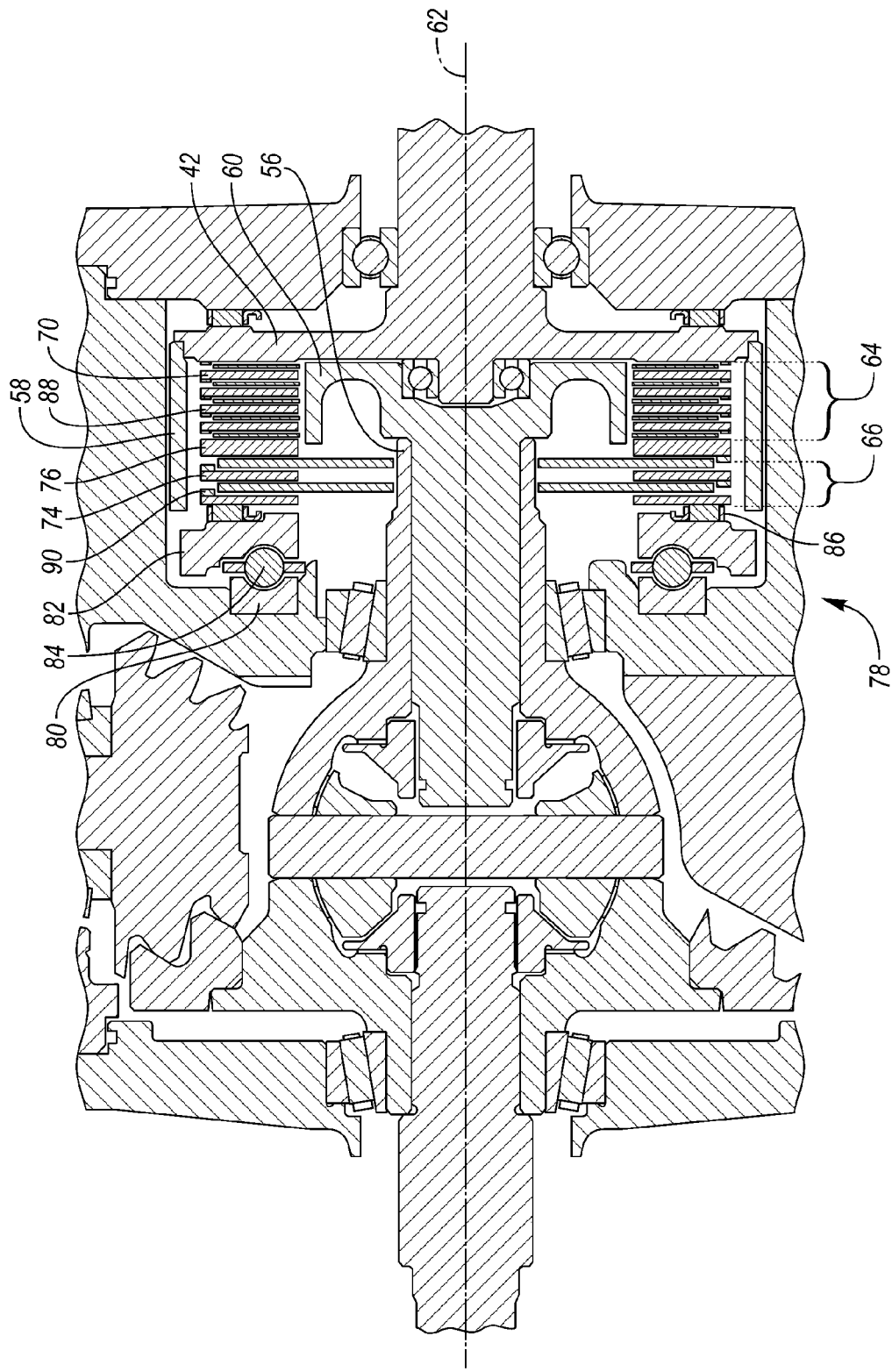
FIG. 6 is cross-sectional view of a rear drive unit having a ball ramp actuator.

The torque transfer clutch assembly 64 and the LSD clutch assembly 66 are preferably actuated by a single, common actuator. Referring now to FIG. 6, the actuator may be a ball ramp actuator 78 capable of separately activating the torque transfer clutch assembly 64 and the LSD clutch assembly 66. The ball ramp actuator 78 includes a stationary plate or ring 80, a ring 82 rotatable about a central axis 62, and at least one ball 84 disposed between the stationary ring 80 and rotatable ring 82. Rotation of the rotatable ring 82, caused for example, by the controller 44 actuating the actuator, causes the balls 84 to travel through grooves in the stationary ring 80 and rotatable ring 82. Due to the profiles of the grooves, as the rotatable ring 82 rotates, the balls 84 cause the rotatable ring 82 to translate axially away from the stationary ring 80 and toward the torque transfer clutch assembly 64 and the LSD clutch assembly 66. The rotatable ring 82 urges the torque transfer clutch assembly 64 and the LSD clutch assembly 66 into engagement, preferably through a thrust bearing or pressure plate 86. In some approaches, the stationary ring is rotatable about the central axis, but does not translate axially along the central axis.

The ball ramp actuator 78 may include a first set of wave springs 88 adjacent to the torque transfer carrier plates 70 and/or a second set of wave springs 90 adjacent to the LSD carrier plates 74. The second set of wave springs 90 preferably have a greater stiffness than the first set of wave springs 88. In this way, axial displacement of the rotatable ring 80 as the motor moves to a first motor position urges the torque transfer clutch assembly 64 into engagement, while the second set of wave springs 90 keeps the LSD clutch assembly 66 out of engagement. Further axial displacement of the rotatable ring 80 as the motor moves to a second motor position subsequently overcomes the stiffness of the second set of wave springs 90 and urges the LSD clutch assembly 66 into engagement. Offsetting the engagements of torque transfer clutch assembly 64 and the LSD clutch assembly 66 may be controlled by providing first and/or second set of wave springs 88, 90 having various stiffnesses.

Figure 7A:
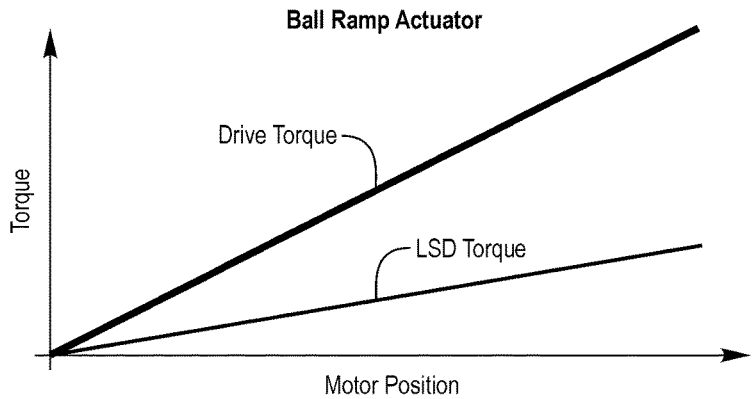
FIGS. 7a and 7b are example clutch engagement profiles for a ball ramp actuator.
Figure 7B:
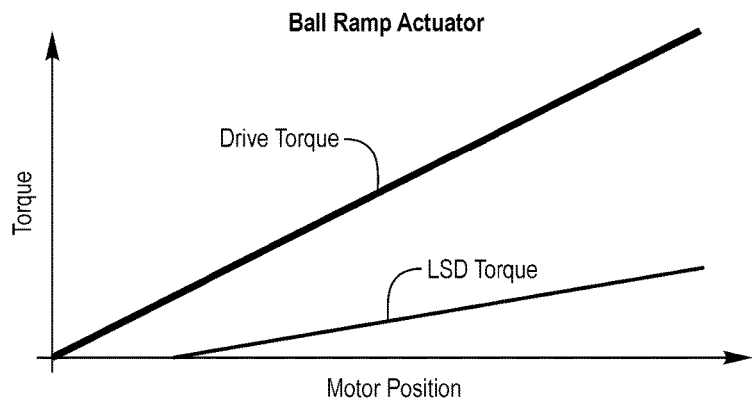

Example clutch engagement profiles for the ball ramp actuator 78 are shown in FIGS. 7*a* and 7*b*. The drive torque, or propulsive torque, represents the amount of toque on the driveshaft. The LSD torque is the maximum achievable torque difference between the two wheels. The LSD torque may be, for example, about one-third of the drive torque. In the clutch engagement profile shown in FIG. 7*a*, torque is transferred through both the torque transfer clutch assembly 64 and the LSD clutch assembly 66 at a first motor position. In the clutch engagement profile shown in FIG. 7*b*, torque is transferred through the torque transfer clutch assembly 64 at a first motor position, while no torque is transferred through the LSD clutch assembly 66 at the first motor position. At a second motor position, torque is transferred through both the torque transfer clutch assembly 64 and the LSD clutch assembly 66. This may be desirable, for example, to improve driveshaft synchronization control.

In addition to a ball ramp actuator, other actuators may be used to actuate the torque transfer clutch assembly 64 and the LSD clutch assembly 66, such as one or more pistons, solenoids, motors, or other suitable hydraulic, pneumatic, electric, thermal, magnetic, or mechanical actuators.

Figure 8:
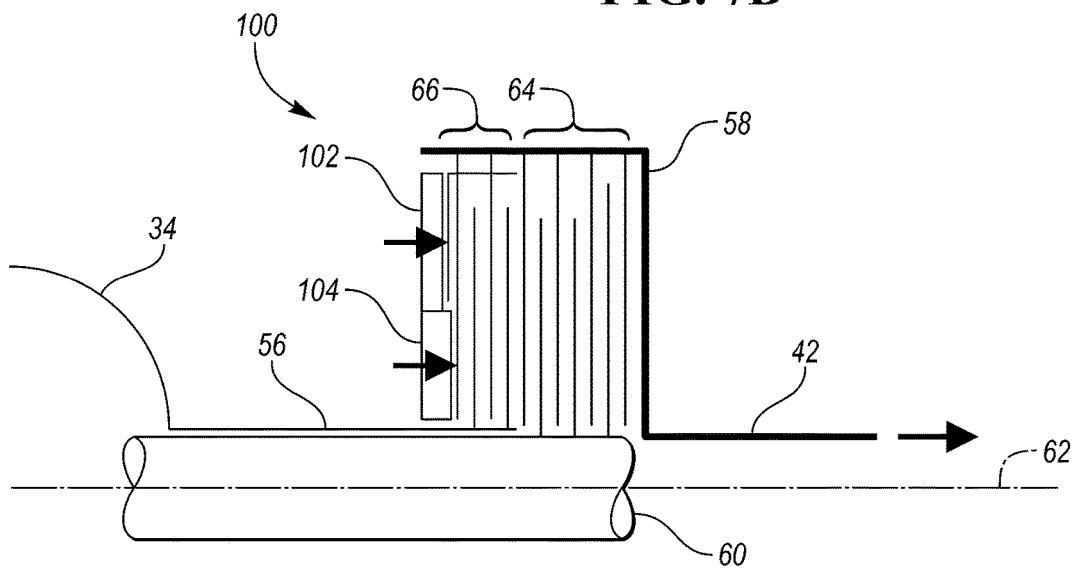
FIG. 8 is a schematic diagram showing a double ball ramp actuator.

Referring now to FIG. 8, a double ball ramp actuator 100 may be used to provide multiple-stage activation. More specifically, a double ball ramp actuator 100 may be used to provide two stage actuation of the torque transfer clutch assembly 64 and the LSD clutch assembly 66 using an outer ring 102 and an inner ring 104, respectively.

Figure 9:
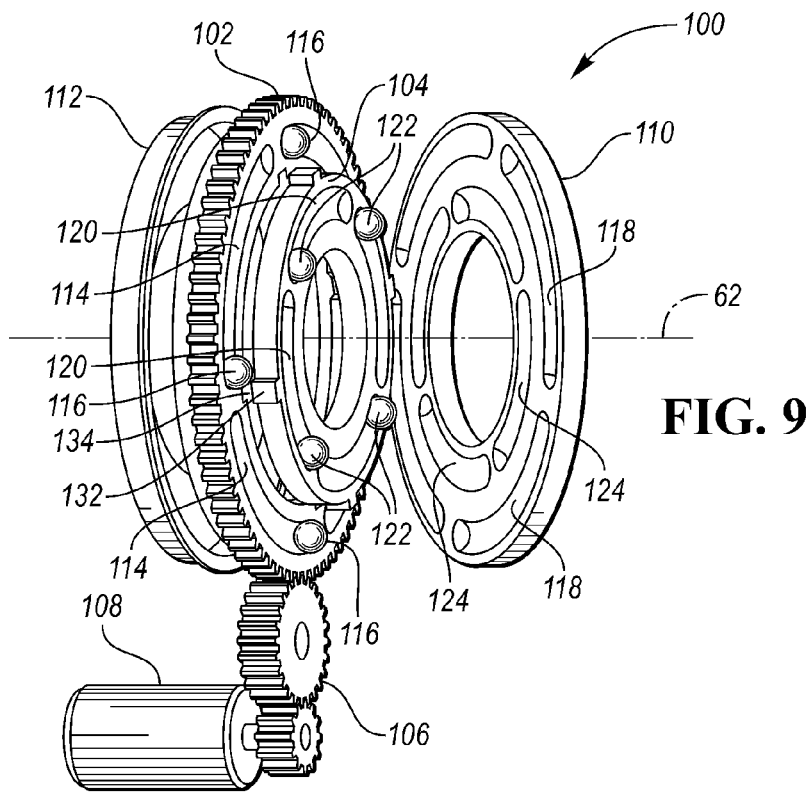
FIG. 9 is a perspective view of a double ball ramp actuator.
Figure 10:
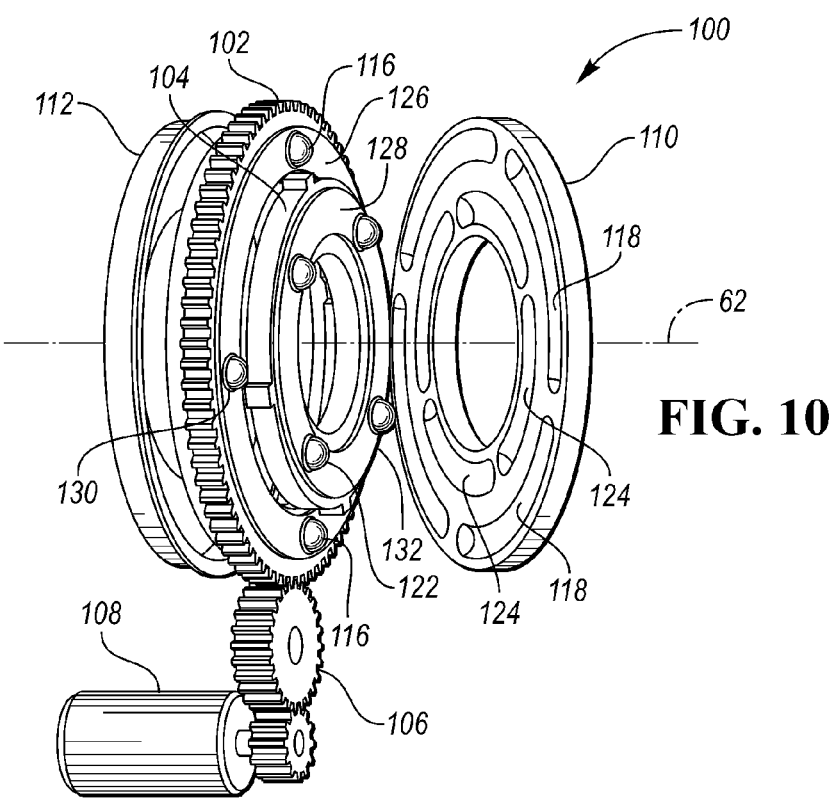
FIG. 10 is a perspective view of a double ball ramp actuator having cages.

As shown in FIGS. 9-11, the double ball ramp actuator 100 includes a drive gear 106 that is selectively rotated by a motor 108. The drive gear 106 is engaged with an exterior surface of the outer ring 102, for example, through a gear teeth arrangement. In this way, as the motor 108 rotates the drive gear 106, the drive gear 106 causes the outer ring 102 to rotate. In some approaches, the double ball ramp actuator 100 further includes a stationary ring 110 and, in still other approaches, a pressure plate 112. In this way, the outer ring 102 and inner ring 104 may be disposed between the stationary ring 110 and pressure plate 112.

Figure 14:
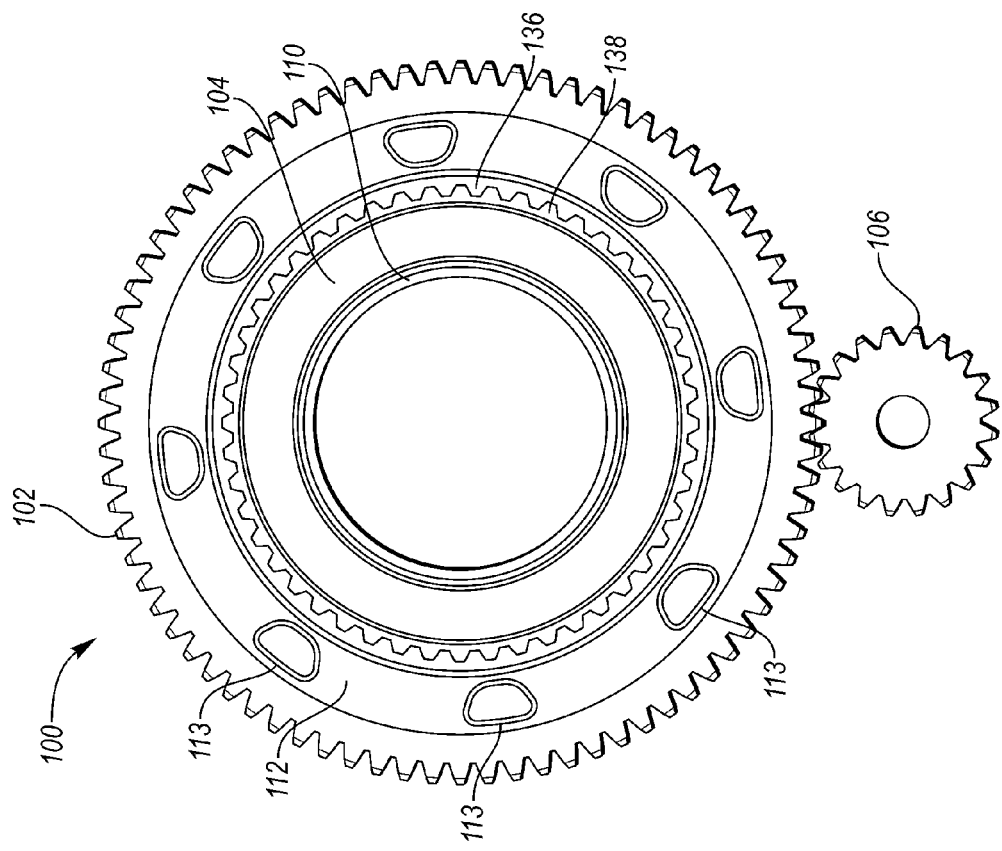
FIG. 14 is a front elevational view of a double ball ramp actuator having a pressure plate with projections.
Figure 13:
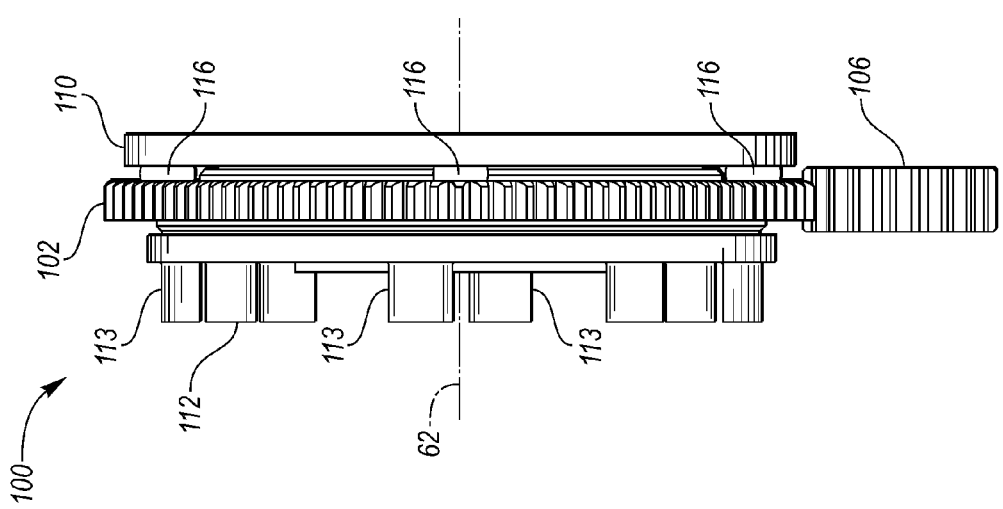
FIG. 13 is a side elevational view of a double ball ramp actuator having a pressure plate with projections.

As shown in FIG. 12, the pressure plate 112 may have a continuous face or side surface. In another approach, shown in FIGS. 13 and 14, the pressure plate 112 includes a plurality of fingers or projections 113 projecting from the face or side surface.

The outer ring 102 has at least one outer depression or groove, and preferably four outer ring grooves 114 disposed on a face of the outer ring 102. As shown in FIG. 11, and discussed in greater detail elsewhere herein, the outer ring grooves 114 have first-stage ramp profiles 114a and second-stage ramp profiles 114b. Balls or bearings 116 are disposed in the outer ring grooves 114 and in corresponding outer grooves 118 of the stationary ring 110 and traverse between the first- and second-stage ramp profiles 114a, 114b. In some approaches, the outer grooves 118 of the stationary ring 110 have groove profiles instead of, or in addition to, the first- and second-stage ramp profiles 114a, 114b of the outer ring 102.

The inner ring 104 similarly has at least one inner groove or depression, and preferably four inner ring grooves 120 disposed on a face of the inner ring 104. The inner ring grooves 120 have first-stage ramp profiles 120a and second-stage ramp profiles 120b. Balls or bearings 122 are disposed in the inner ring grooves 120 and in corresponding inner grooves 124 of the stationary ring 110 and traverse between the first- and second-stage ramp profiles 120a, 120b. In some approaches, the inner grooves 124 of the stationary ring 110 have groove profiles instead of, or in addition to, the first- and second-stage ramp profiles 120a, 120b of the inner ring 104.

Referring momentarily to FIG. 10, the double ball ramp actuator 100 may include an outer cage 126 disposed between the outer ring 102 and the stationary ring 110, and an inner cage 128 disposed between the inner ring 104 and the stationary ring 110. Outer cage 126 includes a plurality of holes 130 spaced circumferentially around axis 62. The holes 130 correspond to and fit over the outer balls 116. Inner cage 128 similarly includes a plurality of holes 132 spaced circumferentially around central axis 62. The holes 132 correspond to and fit over the inner balls 122. Cages 126, 128 act to maintain consistent spacing between balls 116, 122 as the balls rotate about the central axis 62.

The inner ring 104 is engaged with the outer ring 102 such that rotation of the outer ring 102 causes a corresponding rotation of the inner ring 104. This is preferably achieved by engaging an exterior surface of the inner ring 104 with an interior surface of the outer ring 102. In one approach, shown in FIGS. 9-11, the interior surface of the outer ring 102 includes at least one slot 134, and an exterior surface of the inner ring 104 includes at least one key or protrusion 136 sized to engage the slot. In another approach, shown in FIG. 14, an interior surface of the outer ring 102 includes a first plurality of teeth 138, and an exterior surface of the inner ring 104 includes a second plurality of teeth 140 adapted to engage the first plurality of teeth. In either approach, rotational movement of the inner ring 104 relative to the outer ring 102 is inhibited.

Although relative rotational movement is inhibited, the double ball ramp actuator 100 provides uncoupled axial translation of the outer ring 102 relative to the inner ring 104, and vice-versa. In this way, the double ball ramp actuator 100 permits separate and distinct axial movement of the two rings along the central axis 62.

In use, the motor 108 turns the drive gear 106, thereby rotating the outer ring 102. Because the inner ring 104 is splined to the outer ring 102, rotation of the outer ring 102 causes corresponding rotation of the inner ring 104. As the rings rotate, at least one of the outer ring 102 and the inner ring 104 is able to translate or move axially along the central axis 62 relative to the other ring. In a preferred approach, the outer ring 102 and inner ring 104 are able to separately translate along the central axis 62. For example, as will be discussed in greater detail elsewhere herein, the outer ring 102 may translate at a first time (based, for example, on motor position) while the inner ring 104 remains stationary; the inner ring 104 may translate at a second time (based, for example, on motor position) while the outer ring 102 remains stationary; the inner ring 104 may translate at a first time while the outer ring 102 remains stationary; the outer ring 102 may translate at a second time while the inner ring 104 remains stationary; the outer ring 102 and the inner ring 104 may translate at the same time and at different rates; or the outer ring 102 and the inner ring 104 may translate at the same time and in different axial directions. Other combinations of axial movement stages of the outer ring 102 and the inner ring 104 (based, for example, on motor position) are expressly contemplated herein. Furthermore, while only two concentric rings are described herein, three or more concentric rings may be used to provide additional functionality. For example, three concentric rings may be provided, and may have one, two, three, or more profiles stages to provide additional functionality.

Axial movement of the outer ring 102 and the inner ring 104 may be controlled by stage ramp profiles of the outer ring grooves 114 of the outer ring 102 and inner ring grooves 120 of the inner ring 104. As used herein, a ramp profile of a groove refers to the axial depth along a length of the groove. An axial depth of a groove refers to the depth of the groove formed in the ring, and may be considered, for example, between opposing side surfaces or faces of the ring and relative to central axis 62. A stage refers to a segment of the groove. A groove may have, for example, a stage having a constant axial depth, such that the depth of the groove does not vary along such stage. A groove may also have a stage having a varying axial depth. In such a stage, the axial depth increases or decreases along a length of the stage of the groove. Although one or two groove stages are described herein, rings may be provided with grooves having three or more groove stages to provide additional functionality.

Figure 15B:
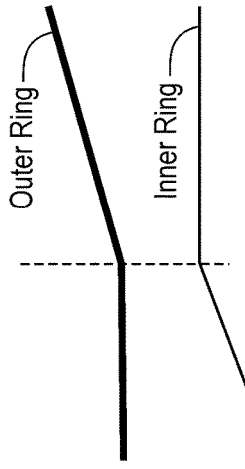
FIGS. 15a-15e are example ramp profiles for a double ball ramp actuator.
Figure 15D:
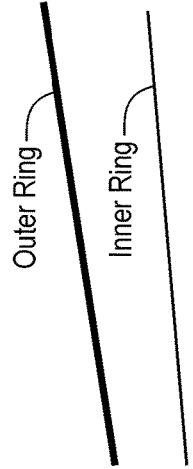
Figure 15E:
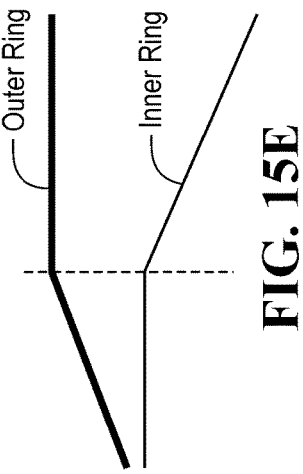
Figure 15A:
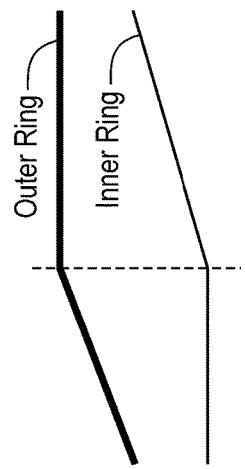

Referring now to FIG. 15a, a double ball ramp actuator 100 may include an outer ring 102 provided with outer ring grooves 114 having a first-stage ramp profile having a varying axial depth and a second-stage ramp profile having a constant axial depth. The double ball ramp actuator 100 may also include an inner ring 104 provided with inner ring grooves 120 having a first-stage ramp profile having a constant axial depth and a second-stage ramp profile having a varying axial depth. In this approach, as the rings rotate through the first stage, the outer balls 116 travel through the varying axial depth profiles of the outer ring grooves 114, thereby increasingly urging the outer ring 102 away from the stationary ring 110. In this way, the outer ring 102 is axially displaced during the first stage. The inner balls 122 travel through the constant axial depth profiles of the inner ring grooves 120 during the first stage, and thus do not urge the inner ring 104 away from the stationary ring 110. In this way, the inner ring 104 is not axially displaced during the first stage. As the rings rotate through the second stage, the outer balls 116 travel through the constant axial depth profiles of the outer ring grooves 114, and thus do not urge the outer ring 102 away from the stationary ring 110. In this way, the outer ring 102 is not axially displaced during the second stage. The inner balls 122 travel through the varying axial depth profiles of the inner ring grooves 120 during the second stage, thereby increasingly urging the inner ring 104 away from the stationary ring 110. In this way, the inner ring 104 is axially displaced during the second stage.

Referring now to FIG. 15b, a double ball ramp actuator 100 may include an outer ring 102 provided with outer ring grooves 114 having a first-stage ramp profile having a constant axial depth and a second-stage ramp profile having a varying axial depth. The double ball ramp actuator 100 may also include an inner ring 104 provided with inner ring grooves 120 having a first-stage ramp profile having a varying axial depth and a second-stage ramp profile having a constant axial depth. In this approach, as the rings rotate through the first stage, the outer balls 116 travel through the constant axial depth s of the outer ring grooves 114, and thus do not urge the outer ring 102 away from the stationary ring 110. In this way, the outer ring 102 is not axially displaced during the second stage. The inner balls 122 travel through the varying axial depth profiles of the inner ring grooves 120 during the first stage, thereby increasingly urging the inner ring 104 away from the stationary ring 110. In this way, the inner ring 104 is axially displaced during the first stage. As the rings rotate through the second stage, the outer balls 116 travel through the varying axial depth profiles of the outer ring grooves 114, thereby increasingly urging the outer ring 102 away from the stationary ring 110. In this way, the outer ring 102 is axially displaced during the second stage. The inner balls 122 travel through the constant axial depth profiles of the inner ring grooves 120 during the second stage, and thus do not urge the inner ring 104 away from the stationary ring 110. In this way, the inner ring 104 is not axially displaced during the second stage.

Figure 15C:
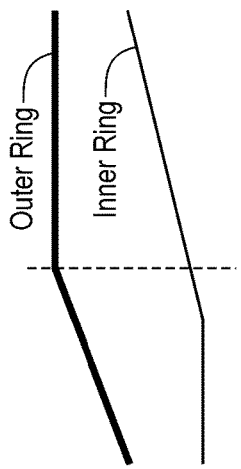

As shown in FIGS. 15a and 15b, ramp profiles grooves 114, 120 of the outer ring 102 and inner ring 104 may be coordinated such that transitions between stages occur concurrently. In another approach, the transitions between stages of the rings may be offset. For example, as shown in FIG. 15c, the grooves 120 of the inner ring 104 may be provided with ramp profiles that transition (e.g., based on motor position) between a first stage and a second stage prior to ramp profiles of the grooves 114 of the outer ring 102 transitioning between a first stage and a second stage. In other approaches, the grooves 120 of the inner ring 104 may be provided with ramp profiles that transition between a first stage and a second stage after ramp profiles of the grooves 114 of the outer ring 102 transition between a first stage and a second stage.

In still another approach, a double ball ramp actuator 100 may include an outer ring 102 provided with outer ring grooves 114 having a single stage profile, and an inner ring 104 provided with inner ring grooves 120 having a single profile. In this approach, the outer ring grooves 114 may have a first slope gradient, and the inner ring grooves 120 may have a second slope gradient different than the first slope gradient. For example, as shown in FIG. 15d, the slope gradient of the outer ring grooves 114 may effect axial movement of the outer ring 102 at a greater rate (e.g., as determined by motor position) than the rate at which the slope gradient of the inner ring grooves 120 effects axial movement of the inner ring 104. Alternatively, the slope gradient of the outer ring grooves 114 may effect axial movement of the outer ring 102 at a slower rate than the rate at which the slope gradient of the inner ring grooves 120 effects axial movement of the inner ring 104.

Figure 16:
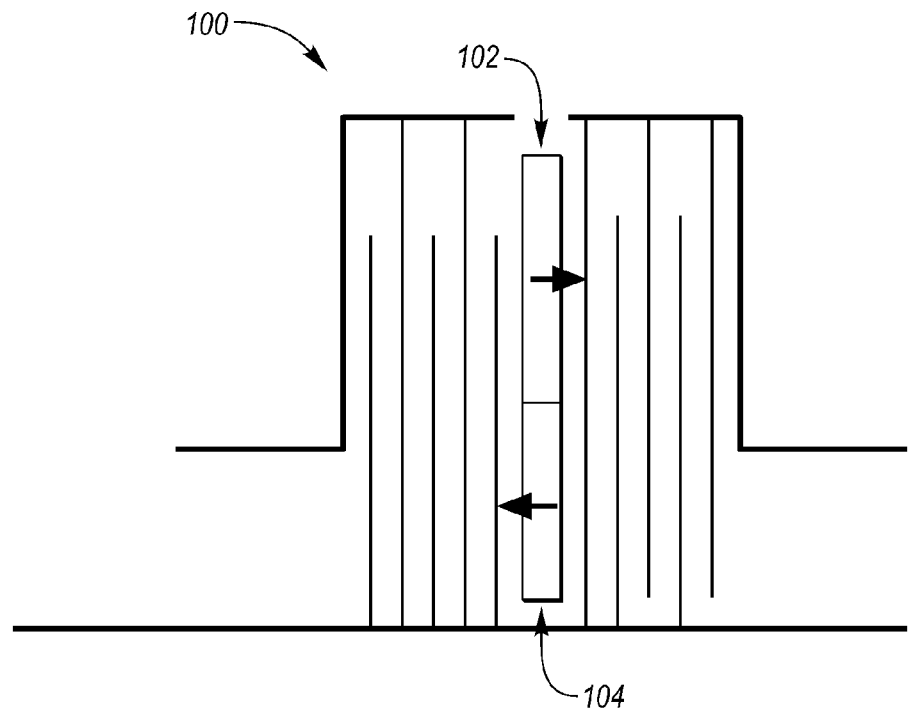
FIG. 16 is a schematic diagram showing a double ball ramp actuator having rings axially movable in opposite directions.

In still another approach, shown in FIG. 15e, a double ball ramp actuator 100 may include an outer ring 102 provided with outer ring grooves 114 having a positive profile stage, and an inner ring 104 provided with inner ring grooves 120 having a negative profile stage. In this way, as shown in FIG. 16, the outer ring 102 may be urged in a first axial direction during rotation of the rings, and the inner ring 104 may be urged in a second axial direction opposite the first axial direction. Opposite axial movement of the two rings may occur concurrently, or may occur at separately and distinctly based on motor position.

Figure 17:
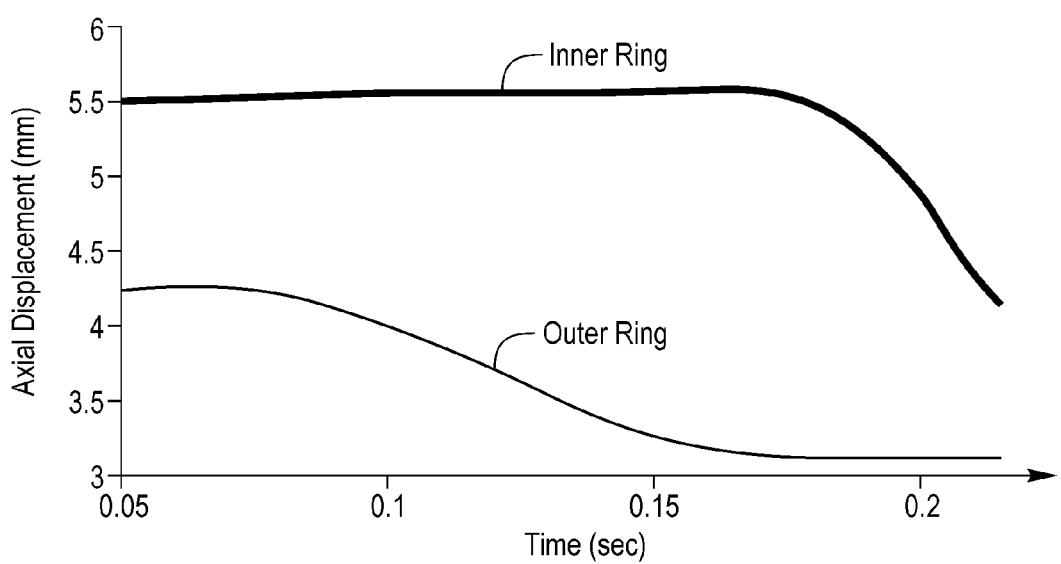
FIG. 17 is a chart showing example axial displacements of inner and outer rings.

As shown in FIG. 17, a double ball ramp actuator 100 may separately axially displace an outer ring 102 and an inner ring 104 to achieve distinct displacements at a given time (e.g., based on a motor position). In this way, the double ball ramp actuator 100 acts as a multi-stage ball ramp actuator. This arrangement permits two axial displacements using only a single actuator. Thus, only a single motor is necessary to achieve the multiple stages. Furthermore, the double ball ramp actuator 100 may be sized and dimensioned to occupy the same space as conventional ball ramp actuators. The sloped grooves can be designed to coordinate the relative movement between the outer and inner ramps 102, 104 depending on the desired application. Furthermore, the double ball ramp actuator 100 may be able to convert rotary motion into axial displacement with very high force amplification, e.g., 100:1 or greater.

Figure 18:
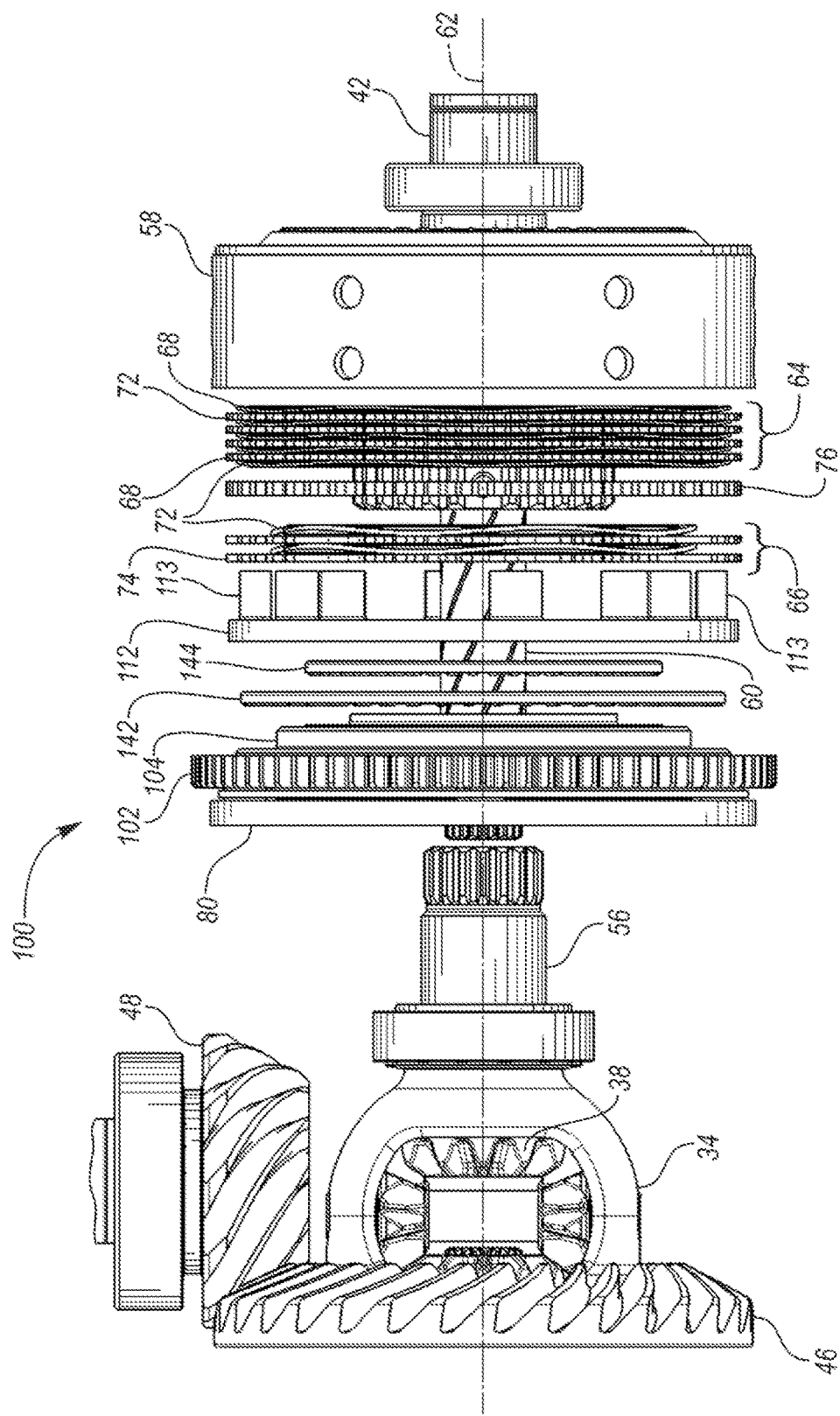
FIG. 18 is an exploded side elevational view of a rear drive unit having a double ball ramp actuator.
Figure 19:
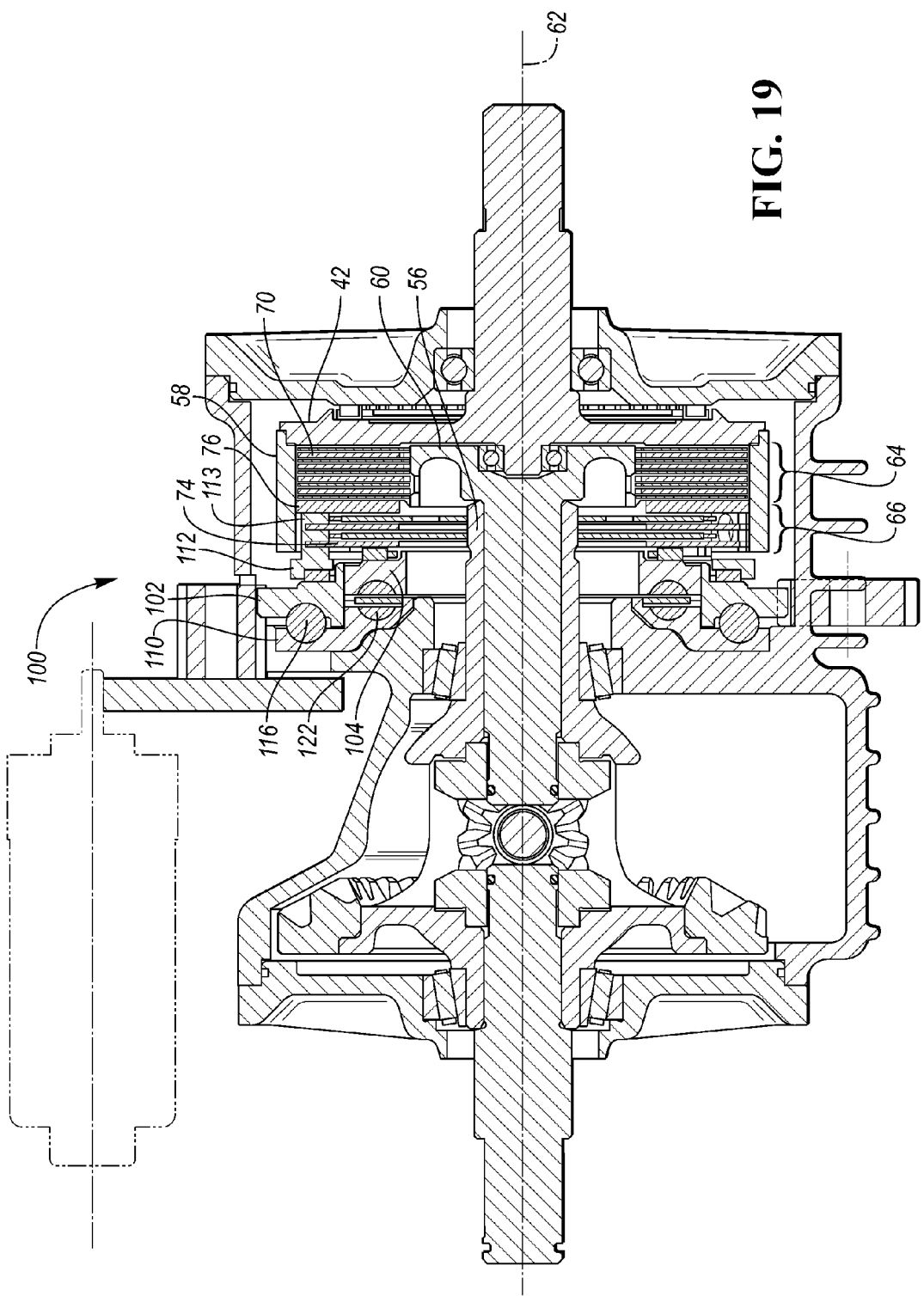
FIG. 19 is a side elevational view of the rear drive unit of FIG. 18.

One application for a double ball ramp actuator 100 is shown in FIGS. 18 and 19. In this approach, the double ball ramp actuator 100 is capable of providing separate, uncoupled axial displacement of a torque transfer clutch assembly 64 and an LSD clutch assembly 66. As shown in FIG. 18, the outer ring 102 axially displaces and imparts an axial force on a thrust bearing 142 (e.g., a needle bearing), which imparts an axial force on the pressure plate 112. The inner ring 104 axially displaces and imparts an axial force on a thrust bearing 144 (e.g., a needle bearing), which imparts an axial force on the LSD clutch assembly 66. In some approaches (not shown), a pressure plate is disposed between the thrust bearing 144 and the LSD clutch assembly.

In the approach shown in FIGS. 18 and 19, the torque transfer clutch plates 68 are wave springs that are rotatably fixed to the intermediate shaft and axially movable relative to the intermediate shaft. Similarly, the LSD clutch plates 72 are wave springs that are rotatably fixed to the differential shaft and axially movable relative to the differential shaft.

Figure 20A:
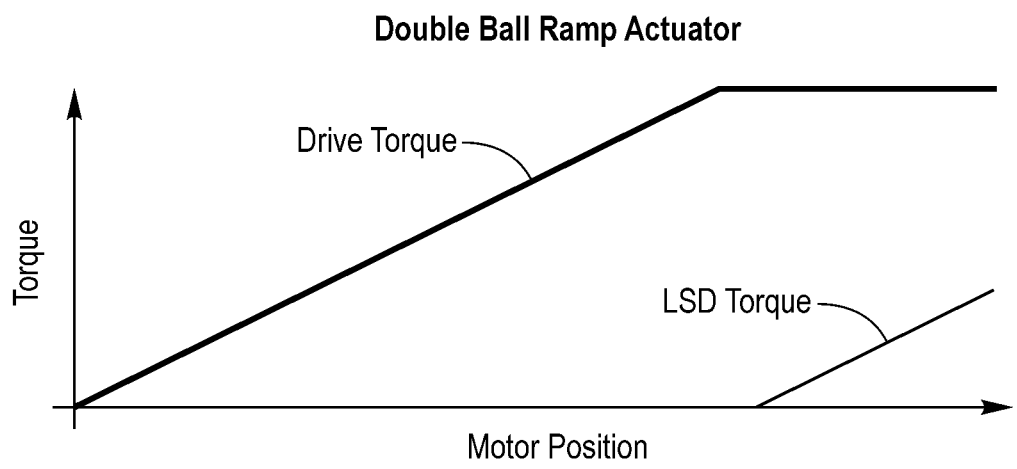
FIGS. 20a and 20b are example clutch engagement profiles for a double ball ramp actuator.
Figure 20B:
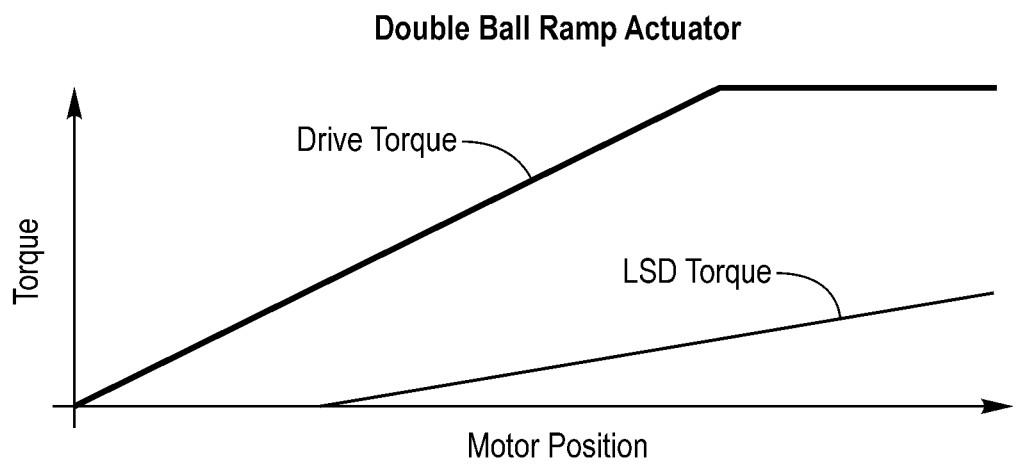

Example clutch engagement profiles for the double ball ramp actuator 100 are shown in FIGS. 20*a* and 20*b*. In the clutch engagement profile shown in FIG. 20*a*, torque is transferred first through the torque transfer clutch assembly 64. At a given motor position, the driveline operates in a traditional eLSD manner, and torque is applied as required through the LSD clutch assembly 66. In this approach, the two clutch assemblies are operated separately and sequentially. In the clutch engagement profile shown in FIG. 20*b*, torque is transferred first through the torque transfer clutch assembly 64. At a given motor position, torque is transferred through both the torque transfer clutch assembly 64 and the LSD clutch assembly 66. At still another motor position, torque is applied as required through the LSD clutch assembly 66. In this approach, the two clutch assemblies are operated separately and, at least at a given motor position, concurrently.

In this way, a torque transfer clutch assembly 64 and an LSD clutch assembly 66 may be provided in a common clutch basket and may be activated by a single, common actuator. The arrangements described herein allow for both disconnect and limited slip capabilities in a package similar in size to traditional RDU package sizes. Minimizing the number of required actuators further reduces weight and cost as compared to traditional RDUs.

Although described herein in conjunction with vehicle clutches, it is expressly contemplated that the double ball ramp actuator 100 may be incorporated in other suitable applications in which multiple-stage actuation may be advantageous.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A secondary axle clutch assembly comprising:
a differential carrier including a differential shaft rotatable about a central axis of rotation;
a plurality of limited slip differential (LSD) clutch plates rotatably fixed to the differential shaft and axially movable relative to the differential shaft;
an intermediate shaft extending coaxially with the differential shaft and rotatable about the central axis of rotation;
a plurality of torque clutch plates rotatably fixed to the intermediate shaft and axially movable relative to the intermediate shaft;
a clutch basket extending over the torque clutch plates and the LSD clutch plates and rotatable about the central axis of rotation, the clutch basket comprising a first plurality of carrier plates disposed adjacent to the torque clutch plates and a second plurality of carrier plates disposed adjacent to the LSD clutch plates; and
an actuator adapted to apply an axial force to the torque clutch plates and the LSD clutch plates to engage the torque clutch plates with the first plurality of carrier plates, and to engage the LSD clutch plates with the second plurality of carrier plates.

2. The secondary axle clutch assembly of claim 1, wherein the intermediate shaft is rotatably connected to a side gear disposed within the differential carrier, and wherein the intermediate shaft includes at least a portion extending within the differential shaft.

3. The secondary axle clutch assembly of claim 1, wherein the clutch basket is rotatably secured to an output shaft, and wherein the torque clutch plates engage the first plurality of carrier plates to transmit torque from the intermediate shaft to the output shaft through the clutch basket.

4. The secondary axle clutch assembly of claim 1, wherein the clutch basket is rotatably secured to an output shaft, and wherein the LSD clutch plates engage the second plurality of carrier plates to transmit torque from the differential shaft to the output shaft through the clutch basket.

5. The secondary axle clutch assembly of claim 1, wherein the torque clutch plates and the LSD clutch plates are coaxial friction plates, and wherein the first plurality of carrier plates and the second plurality of carrier plates are coaxial steel plates.

6. The secondary axle clutch assembly of claim 1, wherein the actuator is adapted to apply a first axial force to the torque clutch plates to engage the torque clutch plates with the first plurality of carrier plates while the LSD clutch plates are disengaged from the second plurality of carrier plates.

7. The secondary axle clutch assembly of claim 1, wherein the actuator is adapted to apply a second axial force to the LSD clutch plates to engage the LSD clutch plates with the second plurality of carrier plates while the torque clutch plates are engaged with the second plurality of carrier plates.

8. The secondary axle clutch assembly of claim 1, further comprising a separator plate disposed between the torque clutch plates and first plurality of carrier plates and the LSD clutch plates and second plurality of carrier plates.

9. The secondary axle clutch assembly of claim 1, further comprising a first plurality of separator springs disposed between the torque clutch plates and the first plurality of carrier plates, and a second plurality of separator springs disposed between the LSD clutch plates and the second plurality of carrier plates, the second plurality of separator springs having a higher stiffness than the first plurality of separator springs.

10. The secondary axle clutch assembly of claim 1, wherein the actuator includes only one motor to activate the actuator.

11. The secondary axle clutch assembly of claim 1, wherein the actuator is selected from the group consisting of a piston and a ball ramp actuator.

12. The secondary axle clutch assembly of claim 11, wherein the ball ramp actuator is a multiple-stage ball ramp actuator comprising:
an axially movable outer ring having at least one outer ring groove and an outer ball disposed in the outer ring groove;
an axially movable inner ring rotatably fixed relative to the outer ring, the inner ring having at least one inner ring groove and an inner ball disposed in the inner ring groove; and
a pressure plate comprising at least one projection projecting axially from the pressure plate, the pressure plate adapted to apply an axial force to the torque clutch plates when the outer ring is axially displaced, the pressure plate further adapted to apply an axial force to the LSD clutch plates when the inner ring is axially displaced.

13. A clutch assembly comprising:
a common actuator that actuates
   first clutch plates, rotatably fixed to a first shaft, to engage first carrier plates rotatably fixed to a clutch basket; and
   second clutch plates, rotatably fixed to a second shaft that encircles the first shaft, to engage second carrier plates rotatably fixed to the clutch basket;
   wherein actuation of the first clutch plates rotatably connects the first shaft to the second shaft through the clutch basket.

14. The clutch assembly of claim 13, wherein the first shaft is coaxial with the second shaft and includes at least a portion extending within a portion of the second shaft that encircles the first shaft.

15. The clutch assembly of claim 13, wherein the common actuator effects a first axial displacement of the first clutch plates prior to effecting a second axial displacement of the second clutch plates.

16. The clutch assembly of claim 13, wherein the common actuator effects a first axial displacement of the first clutch plates at a first rate, and effects a second axial displacement of the second clutch plates at a second rate different than the first rate.

17. The clutch assembly of claim 13, wherein the common actuator is actuated by a single motor.

18. A method comprising:
using a common actuator,
   axially displacing first clutch plates rotationally fixed to a first shaft to rotatably connect, through a clutch basket, an output shaft to an intermediate shaft that is rotatably connected to a side gear disposed within a differential carrier; and
   axially displacing second clutch plates rotationally fixed to a second shaft coaxial with the first shaft, the first shaft extending within the second shaft.

* * * * *